(12) United States Patent
Kamarshi et al.

(10) Patent No.: US 9,558,563 B1
(45) Date of Patent: Jan. 31, 2017

(54) DETERMINING TIME-OF-FIGHT MEASUREMENT PARAMETERS

(71) Applicant: Amazon Technologies, Inc., Seattle, WA (US)

(72) Inventors: Vijay Kamarshi, Cupertino, CA (US); Amit Tikare, Pleasanton, CA (US); Ronald Joseph Degges, Jr., Los Gatos, CA (US); Eric Wang, Cupertino, CA (US); Christopher David Coley, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

(21) Appl. No.: 14/036,523

(22) Filed: Sep. 25, 2013

(51) Int. Cl.
*H04N 5/225* (2006.01)
*G06T 7/20* (2006.01)

(52) U.S. Cl.
CPC ........................................ *G06T 7/20* (2013.01)

(58) Field of Classification Search
CPC ............ H04N 13/0271; H04N 13/0275; H04N 17/002; G06T 3/4038; G06T 5/001; G06T 7/0075; G06T 7/0044; G06T 7/0065; G06T 7/2053; A61B 6/467; A61B 5/4878; A61B 5/0077; A61B 5/1073; A61B 8/0858; A61B 5/1079; A61B 5/0537; G06K 9/6202; G06K 9/627; G06N 7/005
USPC ........................................................ 348/169
See application file for complete search history.

(56) References Cited

U.S. PATENT DOCUMENTS

| 6,974,373 | B2 * | 12/2005 | Kriesel | 452/157 |
| 7,418,392 | B1 | 8/2008 | Mozer et al. | |
| 7,720,683 | B1 | 5/2010 | Vermeulen et al. | |
| 7,774,204 | B2 | 8/2010 | Mozer et al. | |
| 8,103,085 | B1 * | 1/2012 | Zadeh | G06T 7/001 356/237.1 |
| 8,229,222 | B1 * | 7/2012 | Silver | G06K 9/481 382/141 |
| 8,396,252 | B2 * | 3/2013 | El Dokor | 382/106 |
| 8,547,437 | B2 * | 10/2013 | Buehler | G06K 9/00335 348/143 |
| 8,620,772 | B2 * | 12/2013 | Owen | 705/26.9 |
| 8,948,501 | B1 * | 2/2015 | Kim et al. | 382/159 |
| 9,367,731 | B2 * | 6/2016 | Vodrahalli | G06T 7/0081 |

(Continued)

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

*Primary Examiner* — Shan Elahi
(74) *Attorney, Agent, or Firm* — Lee & Hayes, PLLC

(57) ABSTRACT

In a system that monitors the positions and movements of objects within an environment, a depth camera may be configured to produce depth images based on configurable measurement parameters such as illumination intensity and sensing duration. A supervisory component may be configured to roughly identify objects within an environment and to specify observation goals with respect to the objects. The measurement parameters of the depth camera may then be configured in accordance with the goals, and subsequent analyses of the environment may be based on depth images obtained using the measurement parameters.

20 Claims, 5 Drawing Sheets

(56) References Cited

U.S. PATENT DOCUMENTS

| | | | | |
|---|---|---|---|---|
| 2002/0054699 | A1* | 5/2002 | Roesch | G06K 9/6206 382/131 |
| 2005/0058337 | A1* | 3/2005 | Fujimura et al. | 382/159 |
| 2005/0117801 | A1* | 6/2005 | Davis | G06K 9/469 382/173 |
| 2006/0139314 | A1* | 6/2006 | Bell | A63F 13/02 345/156 |
| 2006/0241371 | A1* | 10/2006 | Rafii | G01S 17/89 600/407 |
| 2006/0251293 | A1* | 11/2006 | Piirainen et al. | 382/104 |
| 2009/0133051 | A1* | 5/2009 | Hildreth | 725/28 |
| 2009/0138805 | A1* | 5/2009 | Hildreth | 715/745 |
| 2009/0175540 | A1* | 7/2009 | Dariush | G06K 9/00362 382/195 |
| 2009/0252423 | A1* | 10/2009 | Zhu | G06K 9/00201 382/209 |
| 2009/0284529 | A1* | 11/2009 | De Aguiar et al. | 345/420 |
| 2009/0290042 | A1* | 11/2009 | Shiohara | 348/222.1 |
| 2010/0215257 | A1* | 8/2010 | Dariush | G06K 9/00369 382/159 |
| 2010/0215271 | A1* | 8/2010 | Dariush | G06K 9/00369 382/180 |
| 2011/0054870 | A1* | 3/2011 | Dariush | G06F 3/011 703/11 |
| 2011/0128365 | A1* | 6/2011 | Ren et al. | 348/78 |
| 2011/0137527 | A1* | 6/2011 | Simon et al. | 701/45 |
| 2011/0255741 | A1* | 10/2011 | Jung et al. | 382/103 |
| 2012/0020516 | A1* | 1/2012 | Lee | G06K 9/00771 382/103 |
| 2012/0027266 | A1* | 2/2012 | Ren et al. | 382/117 |
| 2012/0076361 | A1* | 3/2012 | Fujiyoshi | G06T 7/004 382/103 |
| 2012/0086780 | A1* | 4/2012 | Sharma et al. | 348/46 |
| 2012/0120073 | A1* | 5/2012 | Haker | G06T 7/0046 345/420 |
| 2012/0176476 | A1* | 7/2012 | Schmidt | G01S 17/89 348/46 |
| 2012/0182392 | A1* | 7/2012 | Kearns | B25J 11/009 348/46 |
| 2012/0223885 | A1 | 9/2012 | Perez | |
| 2012/0249830 | A1* | 10/2012 | Tsubaki | G06T 5/008 348/229.1 |
| 2013/0148102 | A1* | 6/2013 | Oggier | G01C 3/08 356/5.01 |
| 2013/0162768 | A1* | 6/2013 | Lie | H04N 13/0264 348/43 |
| 2013/0163879 | A1* | 6/2013 | Katz et al. | 382/195 |
| 2013/0222369 | A1* | 8/2013 | Huston | G06T 17/00 345/419 |
| 2013/0343607 | A1* | 12/2013 | Wilf | G06F 3/017 382/103 |

* cited by examiner

DETERMINING TIME-OF-FIGHT MEASUREMENT PARAMETERS

BACKGROUND

Augmented reality environments allow interactions among users and both real-world objects and virtual or digital objects. To achieve an augmented reality environment, a system may project content onto projection surfaces, such walls or a portable projection surface, within an environment. In addition, this system may monitor the environment for user gestures and speech, in response to which the system may perform predefined actions.

In order to detect the locations of objects, such a system may visually monitor the environment for objects of interest, such as projection surfaces, human users, hands of users, faces of users, and so forth. However, because tracking objects in this manner may be computationally expensive, the system may have difficulty tracking these objects in real-time or near-real-time, thus lessening the experience of a user employing the system.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques for obtaining depth images of a scene containing multiple objects that are to be identified and tracked over time. The systems and techniques are described with reference to an observation system configured to capture depth images using a time-of-flight-based range camera. The range camera comprises an illumination unit and a frame of sensors that measure reflected light from the observable surface points of a scene to determine depth or distance values corresponding to the surface points. The range camera measures the reflected light over a period of time, referred to as an integration time or sensing time, in order to determine the lengths of the paths that the light has traveled to reach the respective sensors.

In certain embodiments described herein, a scene is analyzed to detect potential objects of interest. After identifying the objects, the observation system may specify illumination intensities and/or integration times that are to be used when subsequently acquiring depth images corresponding to certain objects. Over time, portions of depth images corresponding to the objects are more closely analyzed to identify and track the objects.

In some situations, the observation system may specify an observation goal and/or priority for each of the objects, and illumination intensities and/or integration times may be specified based on the goals. Goals may be specified based on the types of information that are to be gathered regarding the objects. For example, an object may be identified as a hand, and the observation system may specify a goal of detecting the trajectory of the hand at a high degree of temporal resolution. This may be accomplished by using a short integration time to provide a high frame rate, while possibly sacrificing accuracy of depth measurements. Alternatively, the system may specify a goal of detecting finger positions with a high degree of spatial depth accuracy, which may be accomplished by using a relatively long integration time and correspondingly low frame rate.

Figure 1:
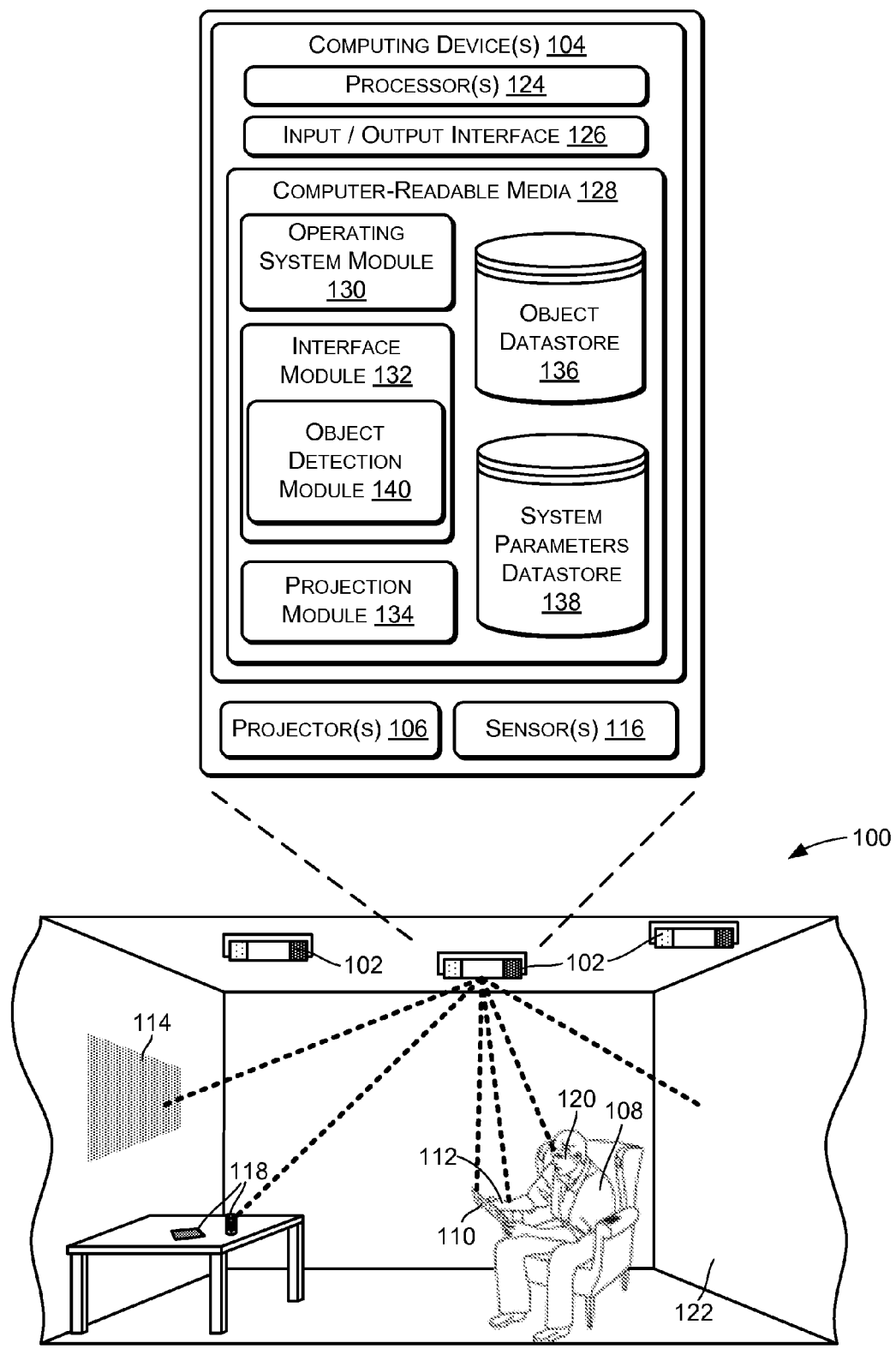
FIG. 1 illustrates an environment that includes an augmented reality functional node (ARFN) configured to track objects within an environment.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment 100 illustrates three nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content.

For instance, a user 108 within the environment 100 may request that the ARFN 102 project a particular electronic book that the user 108 wishes to read. In response, the ARFN 102 may project the book onto a projection surface within the environment 100, such as onto a portable projection surface 110. In another example, the user 108 may request that the ARFN 102 project a particular movie or show that the user 108 wishes to watch. In response, the ARFN 102 may obtain the content (locally or remotely) and may project the content onto a surface in the environment 100. In yet another example, the ARFN 102 may be configured to project a user interface (UI), such as a keyboard, a slider bar, a virtual remote control to operate a television within the environment 100, a telephone keypad, or any other type of UI. In some cases, the ARFN 102 may project the UI onto the projection surface 110, a hand 112 of the user 108, or any other surface within the environment such as a wall area 114.

As discussed in further detail below, the ARFN 102 may include one or more sensor(s) 116 that may obtain data from the environment 100. In some implementations, the sensors 116 may include cameras (e.g., motion and/or still cameras), Time-of-Flight (ToF) sensors, audio sensors (e.g., microphones), ultrasound transducers, heat sensors, motion detectors (e.g., infrared imaging devices), depth sensing cameras, weight sensors, touch sensors, tactile output devices, olfactory sensors, temperature sensors, humidity sensors, pressure sensors, or combinations thereof. In a particular implementation, the sensors 116 may include cameras that capture images of the illustrated user 108 providing input to the ARFN 102, such as by operating a projected UI, and in response, the ARFN 102 may provide feedback to the user 108 and/or may cause performance of actions corresponding to the selection by the user 108. For instance, when the ARFN 102 projects a remote control, the ARFN 102 may provide feedback to the user 108 indicating which button(s) a user is in position to select, may identify a particular selection of the user 108 (e.g., a selection to power on the television) and, in response, may operate the television according to the identified selection.

While a few examples have been given, it is to be appreciated that the ARFN 102 may project any other sort of content within the environment 100, including audio, video, or other content that can be perceived by user senses (e.g., aromatic content). In addition, the ARFN 102 may recognize and interpret gestures that are made by the user 108 without reference to a UI projected within the environment 100.

In the described embodiment, the sensors 116 may include a range camera or other depth sensor that captures depth information corresponding to surfaces within the environment 100. The range camera may utilize time-of-flight measurements to determine distances of observed surface points from the ARFN 102. For example, the range camera may transmit non-visible light such as infrared light and may monitor reflections of the transmitted light to determine the path lengths of the light as it travels from the camera, to different surface points, and back to the camera. By imaging the environment 100 in this manner, the ARFNs 102 may identify objects within the environment. The ARFNs may also track the positions of objects over time.

FIG. 1 shows example light paths (shown as dashed lines) that may be used to measure distances to surface points within the room such as surface points of the wall area 114, miscellaneous objects 118 on a table, the projection surface 110, the hand 112 of the user 108, the head 120 of the user 108, and a wall 122 of the environment 100. Generally, the ARFNs 102 may identify and track the positions of various different objects within the environment 100, such as potential display surfaces, articles of furniture, items resting on furniture, items held by a user, etc. Thus, although only six light paths are shown, similar paths exist and are measured for multiple different surface points within the environment of the user, including multiple surface points of the individual objects. Note that although the reflections are referred to as being from "points" of a surface, each such "point" is a small area having a size that depends on the dispersion of the transmitted and reflected light.

By tracking the positions of a user's hands, fingers, arms, face, etc. over time, the observation system may detect gestures of the user 108. Such gestures may be interpreted as instructions or commands to be implemented by the ARFNs 102.

As illustrated, the computing device 104 of the example ARFN 102 includes one or more processors 124, an input/output interface 126, and memory or computer-readable media 128. The processors 124 may be configured to execute instructions, which may be stored in the computer-readable media 128 or in other computer-readable media accessible to the processors 124.

Figure 2:
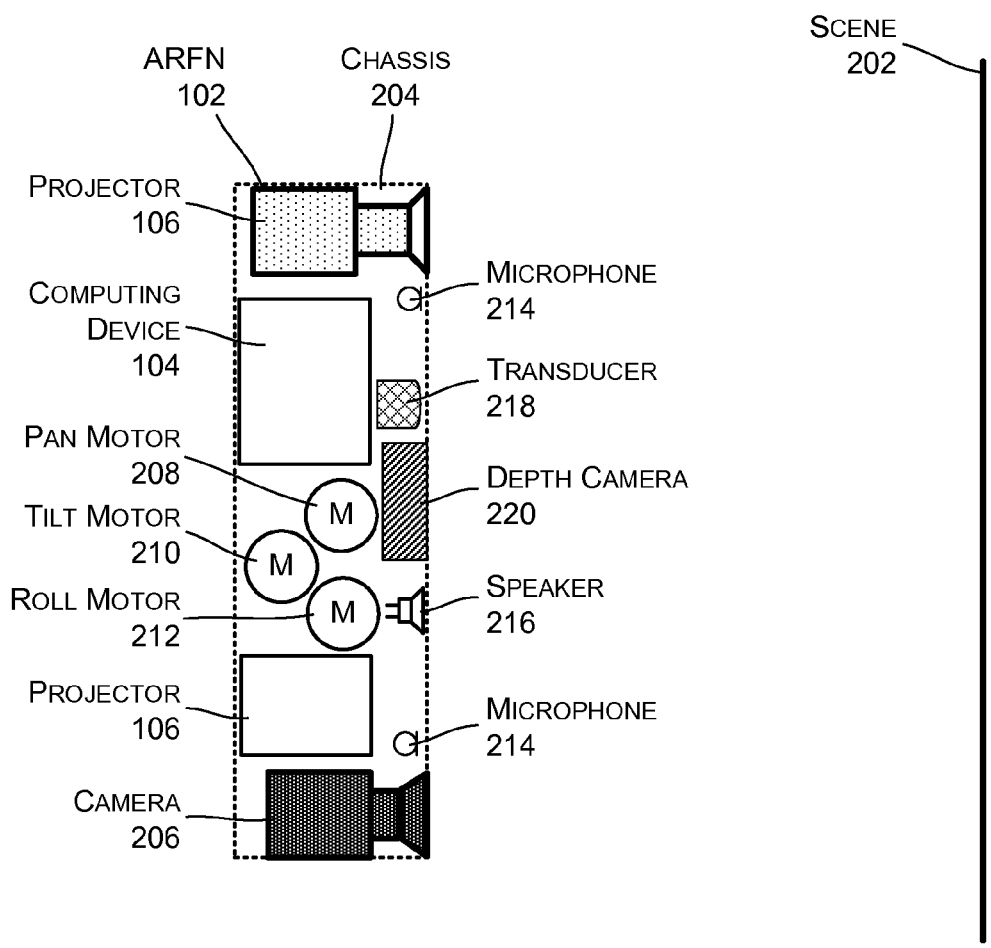
FIG. 2 illustrates an example ARFN.

The input/output interface 126, meanwhile, may be configured to couple the computing device 104 to other components of the ARFN 102, such as the projector 106, the sensors 116, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106, the sensors 116, or both. Therefore, it is to be appreciated that the illustration of the ARFN 102 of both FIGS. 1 and 2 is for illustrative purposes only, and that components of the ARFN 102 may be configured in any other combination and at any other location.

The computer-readable media 128, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 104. The computer-readable media 128 may reside within a housing of the ARFN 102, on one or more storage devices accessible on a local network, on cloud storage accessible via a wide area network, or in any other accessible location.

The computer-readable media 128 may store several modules, such as instructions, datastores, and so forth that are configured to execute on the processors 124. For instance, the computer-readable media 128 may store an operating system module 130, an interface module 132, a projection module 134, an object datastore 136, and a system parameters datastore 138.

The operating system module 130 may be configured to manage hardware and services within and coupled to the computing device 104 for the benefit of other modules. The interface module 132, meanwhile, may be configured to receive and interpret commands received from users within the environment 100. For instance, the interface module 132 may analyze and parse images captured by the sensors 116 to identify one or more hands in the environment 100. In response to recognizing a hand and identifying a gesture formed by the hand, the interface module 132 may interpret the gesture and cause the ARFN 102 to perform a corresponding action. For instance, if the user 108 within the environment 100 makes a gesture requesting that the ARFN 102 project a certain piece of content, the interface module 132 may interpret the gesture and cause the projection module 134 to project the content via the projector 106.

In addition, the interface module 132 may include an object detection and tracking module 140 that is configured to identify and track objects of interest within the environment 100. In some instances, the object datastore 136 stores an indication of "objects of interest"—or objects that the ARFN 102 has been instructed to track. In some instances, these objects may include the portable projection surface 110, the hand 112 or other body part of the user 108, or any other object. When the object detection and tracking module 140 detects an object, the module 140 may update the object datastore 136 to reflect the presence of the object within the environment 100. In addition, the module 140 may continue to track the location and/or orientation of the object over time and may store this information in the object datastore 136 in association with the object. Other components of the ARFN may then use this information for a variety of purposes. For instance, the projection module 134 may use this information for projecting content toward an identified projection surface (e.g., the surface 110) as the surface moves through the environment.

FIG. 2 shows additional details of an example ARFN 102. The ARFN 102 is configured to scan at least a portion of a scene 202 and the objects therein. In a particular implementation, the scene 202 may be at least a portion of the environment 100 of FIG. 1. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface within the scene 202. Suitable technologies include a digital micromirror device (DMD), liquid crystal on silicon display (LCOS), liquid crystal display, 3LCD, and so forth. The projector 106 may have variable zoom and focus capabilities.

One or more cameras 206 may also be disposed within the chassis 204. The cameras 206 are configured to image the scene 202 in visible light wavelengths, non-visible light wavelengths, or both. The cameras 206 may have variable zoom and focus capabilities.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 206. For example, in one implementation the actuator may comprise a pan motor 208, a tilt motor 210, a roll motor 212, and so forth. The pan motor 208 is configured to rotate the chassis 204 in a yawing motion. The tilt motor 210 is configured to change the pitch of the chassis 204. The roll motor 212 is configured to move the chassis 204 in a rolling motion. By panning, tilting, and/or rolling the chassis 204, different views of the scene 202 may be acquired.

One or more microphones 214 may be disposed within the chassis 204, or elsewhere within the scene 202. The microphones 214 may be used to acquire input from a user in the scene 202, may be used to determine the location of a sound, or may be used to otherwise aid in the characterization of and receipt of input from the scene 202. For example, the user may make a particular noise, such as a tap on a wall or a snap of the fingers, which are pre-designated as attention command inputs. The user may alternatively use voice commands. Such audio inputs may be located within the scene 202 using time-of-arrival differences among the microphones 214 in order to determine positions of users.

One or more speakers 216 may also be present to provide for audible output. For example, the speakers 216 may be used to provide output from a text-to-speech module or to playback pre-recorded audio.

A transducer 218 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a time-of-flight camera or other depth sensor 220 for sensing three-dimensional (3D) characteristics of objects within the scene 202. In certain embodiments, the depth sensor 220 may comprise a time-of-flight or other range camera, which uses range imaging to determine distances from the sensor to multiple surfaces that are visible to the sensor 220.

Range cameras may use various technologies to determine distances to points of a scene. In embodiments described herein, the depth sensor 220 uses time-of-flight techniques to determine distances. Time-of-flight techniques utilize a signal that is radiated from the sensor and reflected from one or more surface points of the scene. In the described embodiments, the signal comprises a non-visible light signal, although other types of signals may also be used. For example, LIDAR technology utilizes reflected RF signals to determine distances to objects or surface points.

In the described embodiment, the depth sensor 220 comprises a time-of-flight range camera that determines distances to different points within the scene based on time-of-flight of light or other propagated signals. As will be described in more detail below, a depth sensor such as this transmits a signal onto surfaces of the scene 202 and senses reflections of the signal from different points of the surfaces. The depth sensor 220 may use various techniques to measure the travel times of the signal from the depth sensor 220 to the surface points and back to the camera.

In certain embodiments, the entire scene may be illuminated with a pulsed or modulated light signal, such as an infrared light signal. The depth sensor 220 may have a two-dimensional (2D) array of photodetectors, each of which receives reflected light from a corresponding point of a surface within the scene 202. Because the light signal takes time to propagate from the sensor, to the surface point, and back to the corresponding photodetector, the reflected light signal will be delayed in comparison to that of the transmitted light signal. This delay is apparent in the phase difference between the transmitted signal and the reflected signal as measured by the photodetector. Furthermore, the distance of the reflecting surface can be calculated from the delay based on the known propagation speed of light. Thus, a time-of-flight-based camera may be configured to measure phase differences between transmitted and reflected light and to calculate distances based on the measured phase differences.

In order to obtain an accurate measurement of phase differences, the phases of the transmitted and reflected signals may be compared electronically over a time period, referred to herein as a sensing duration. Longer sensing durations may be used to produce more accurate measurements. A measured phase difference is then converted to a distance as a function of the known speed of light.

The sensing durations used by the depth sensor 220 may be configured to achieve various measurement goals. Longer sensing durations typically produce more accurate depth measurements. However, longer sensing durations also result in slower frame rates. Furthermore, sensing durations need be long enough to accommodate distant objects. More specifically, sensing durations need to be long enough to provide time for a transmitted light signal to travel to the surface of the object and back again.

Different types of distance or depth sensing may be used in various embodiments. For example, lidar is a technology that uses techniques similar to those described above in conjunction with laser illumination to determine distances to objects or surfaces. When using lidar, a pulsed or modulated laser signal may be scanned over an area using rotating mirrors or other mechanisms. Phase differences between the transmitted and reflected signals are then used to calculate corresponding distances.

Structured light techniques may also be used to determine surface depths. Structured light comprises a geometric pattern that is projected onto the surfaces of a scene. For example, multiple parallel lines may be projected onto the scene. When viewed from the same perspective as the projector, the lines appear straight. When viewed from other perspectives, however, the lines are curved due to irregular surface shapes. By placing a camera at an offset from the projector, these curves may be observed and analyzed to detect the distances of surface points from the projector and/or camera.

In FIG. 2, the computing device 104 is shown within the chassis 204. In other implementations, however, all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment 100, such as televisions, stereo systems, lights, and the like.

In other implementations, the components of the ARFN 102 may be distributed in one or more locations within the scene 202. As mentioned above, microphones 214 and speakers 216 may be distributed throughout the environment that includes the ARFN 102. The projector 106, the camera 206, and the depth sensor 220 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
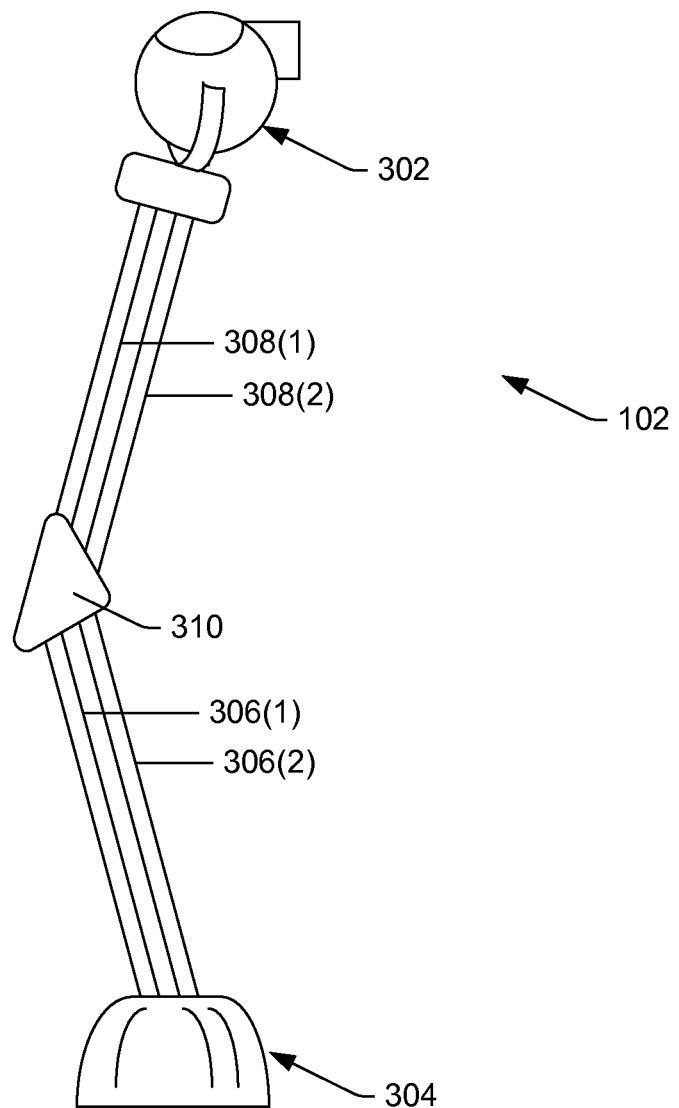
FIG. 3 illustrates an alternative configuration of an example AFRN.

FIG. 3 shows an example of an ARFN 102 that resembles a table lamp. In this example, the device 102 has a head 302 attached to a base 304 by a movable arm mechanism. The arm mechanism has two base members or rods 306(1) and 306(2) connected to two head members or rods 308(1) and 308(2) via a joint connector 310.

The ARFN 102 may contain any of the components shown in FIG. 3 as well as other components that may be used to control and/or monitor movement of the head 302 relative to the base 304. The head 302 may contain the projector 106, the camera 22206, and the depth camera 220, for example. The base 304 may contain components such as power components, operating logic, sensor interfaces, actuator interfaces, and so forth. Generally, the components shown in FIG. 2 may be located in either the head 302 or the base 304 of the device 102.

Figure 4:
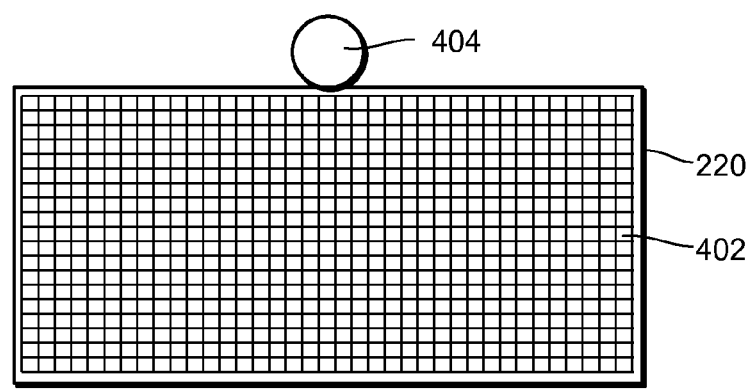
FIG. 4 figuratively illustrates selected components of a time-of-flight-based depth sensor.

FIG. 4 figuratively illustrates an example configuration of the illumination and light sensing components of the depth sensor 220. The depth sensor 220 comprises a frame or grid of individual photodetectors or other light sensors 402. The light sensors 402 are configured to sense and/or measure light that is produced by an illuminator 404 and reflected from the scene 202. The light may comprise visible or non-visible light, and may be modulated or pulsed by the illuminator 404.

Each light sensor 402 corresponds to a pixel of a two-dimensional image frame and to a corresponding surface point of the observed scene 202. The depth sensor 220 may have a lens or other optics, not shown, that gathers the light from the scene and converges or focuses the light on the individual sensors 402.

To produce a single time-of-flight measurement, the sensors 402 are activated for a finite time period, referred to herein as a sensing duration. During this time period, the sensors 402 accumulate or integrate electrical charges as a function of the intensity of the reflected light. The sensors 402 are controlled as a function of the illumination modulation so that the accumulated charges of the individual sensors vary as a function of the phase differences between the transmitted light signal and the received light signal. The phase differences are used as the basis for calculating distances between the sensors and their corresponding surface points. Specifically, the phase differences are converted to distances using a conversion function that is based on the known propagation speed of light.

The individual distance measurements of the sensors are compiled to create a depth image. Each depth image comprises a 2D array of pixels, corresponding to a 2D array of surface points within the scene 202. Each pixel has a value comprising or indicating the distance from the depth sensor 202 to the corresponding surface point of the scene 202. Depth images may also be referred to as depth maps.

Figure 5A:
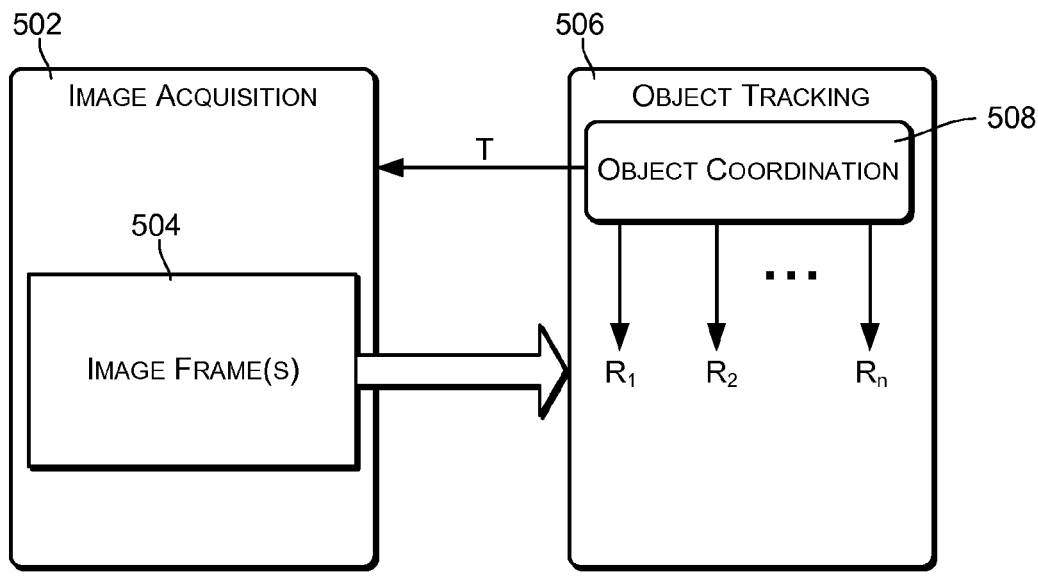
FIGS. 5a and 5b are block diagrams illustrating an example of detecting and tracking multiple objects within an environment using components of the ARFN.
Figure 5B:
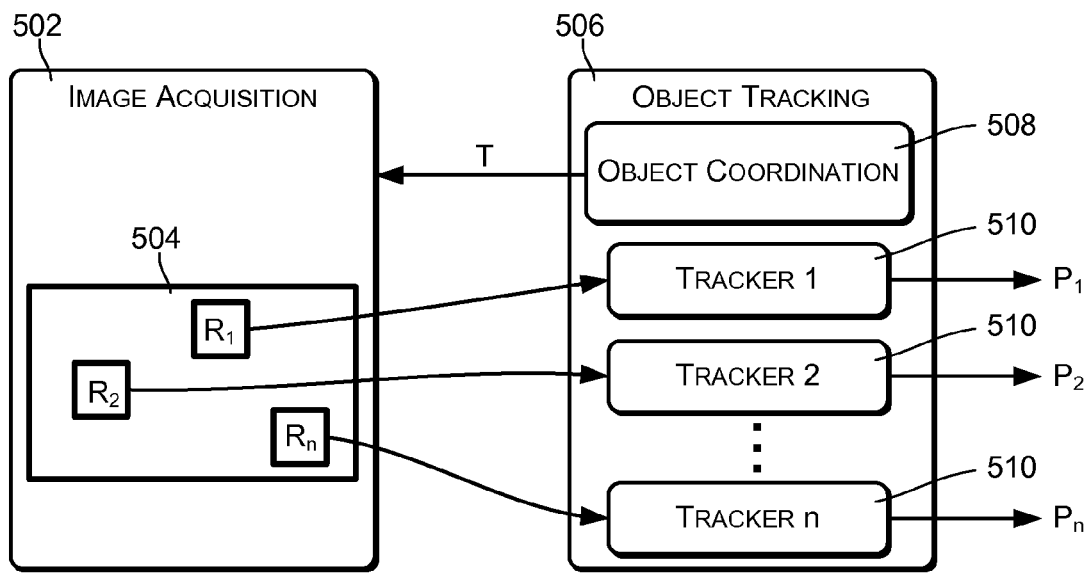

FIGS. 5a and 5b illustrate an example of logical functionality that may be implemented by the object detection and tracking module 140 in order to efficiently identify, locate, and track objects. Referring first to FIG. 5a, the object detection and tracking module 140 may comprise an image acquisition component 502, which may be configured to work in conjunction with the depth sensor 220 and/or other cameras to obtain images or image frames 504 of a scene within the environment 100. The image frames may include depth images or frames as well as images indicating color characteristics of the scene 202.

Each image frame 504 comprises a two-dimensional array of pixel values. The pixels values of depth frames indicate distances from the depth sensor 220 to corresponding surface points of the scene observed by the depth sensor 220 and other cameras. Pixel values of other types of image frames may indicate colors or other information regarding corresponding surface points.

The object detection and tracking module 140 may further comprise an object tracking component 506, which may be configured to receive the image frames 504 from the image acquisition component 502, to identify objects represented by the image frames 504, to determine poses (locations and orientations) of the objects, and to track movement of the objects over time based on image frames that continue to be received from the image acquisition component 502.

Object detection and identification may be performed using techniques such as feature detection. Feature detection works by searching an image for low-level features such as surface areas, shapes, linear edges, curved edges, corners, colors, textures, etc. The features are then compared to features of known objects to identify areas of the image representing the known object. Generally, object detection and identification may utilize feature detection and extraction, template matching, shape recognition, color comparison, and other techniques.

The object tracking component 506 may comprise an object coordinator component 508 that detects and performs coarse identifications of objects within the scene 202 by analyzing one or more of the image frames 504. The object coordination component 508 may comprise a process or thread that is executed by the processor 124.

Depth images processed by the object coordination component 508 may be captured by the depth sensor 220 using an illumination intensity and an integration time that are chosen to result in reasonable accuracy across the varying surfaces and distances of the observed scene. For example, a relatively long integration time may be used to coarsely identify objects. The integration time may be selected in order to accommodate the maximum expected distances of surface points from the depth sensor 220.

In some instances, the image frames 504 may comprise down-sampled versions of the images captured by the various cameras and sensors. Additionally or alternatively, the algorithms used by the coordinator component 508 to analyze the image frames 504 may be simpler as compared to the algorithms used to more finely analyze these images in subsequent steps.

After coarsely identifying objects and their locations, the coordinator component 508 compares the coarsely identified objects and their locations with information about known, tracked objects as stored by the object datastore 136. If the coordinator component 508 determines that an identified object is not currently indicated by the object datastore 136 as being within the environment 100, then the coordinator component 508 adds an indication of this new object to the object datastore 136.

After identifying potential objects of interest, the coordinator component 508 defines regions of the observed environment that contain the objects of interest. Regions of interest are referenced in FIGS. 5a and 5b as regions $R_1$ through $R_n$. FIG. 5b illustrates that the regions may correspond to rectangular areas of pixels or sensors within the image frames 504. Each region of interest corresponds to an area of an image frame that is less than entirety of the image frame.

FIG. 5b illustrates functionality implemented by the object tracking component 506 after the identification of the regions R. In response to identification of the regions R, the object coordinator component 508 launches at tracker or tracking component 510 corresponding to each of the regions R to perform a finer level of identification and tracking with respect to the objects previously identified as being within the regions R. Each tracking component 510 may comprise a process or thread that is executed by the processor 124.

The object coordinator component 508 may also supply time-of-flight measurement parameters T for use by the image acquisition component 502 when obtaining depth images for further analysis by the tracking components 510. The measurement parameters may include illumination intensity and/or sensing duration, and may be specified as a function of observation goals that are associated with one or more of the objects identified as being within the observed scene.

For example, assume that the region $R_1$ contains an object that is relatively distant from the depth sensor 220. In this case, the coordinator component 508 may supply a corresponding integration time $T_1$ that is relatively long, to account for the relatively large distance that a light signal travels between the depth sensor 220 and the object. The region $R_2$ may contain an object that is relatively near the depth sensor 220. In this case the coordinator component 508 may supply a corresponding integration time $T_2$ that is relatively short, to account for the relatively small distance between the depth camera and the object. Using a short integration time may allow relatively faster frame rates, and may allow the corresponding tracking component 510 to track the object at a faster rate.

The coordinator component 508 may execute occasionally to examine overall images of the environment as the tracking components 510 execute more frequently. Similarly, the coordinator component 508 may operate at a lower priority than the tracking components 510.

As the coordinator component 508 identifies additional potential objects of interest, the coordinator component 508 may launch corresponding additional tracking components 510 to track the additional potential objects of interest. Furthermore, if an object leaves the environment, and hence is no longer within the captured images of the environment for a threshold amount of time, then the tracking component 510 responsible for tracking this object may be terminated.

Each tracking component 510 receives and analyzes only those portions or pixels of the image frames 504 that correspond to the corresponding region R. The tracking component 510 may be configured to implement computationally heavier object algorithms (as compared to those used by the coordinator component) to confirm that an object is indeed an object of interest and, thereafter, to track the object of interest. Because the tracking component 510 runs only in a constrained region of the depth image, the tracking component 510 is able to execute in real-time or near-real-time. In addition, the tracking component 510 is able to dynamically update the object's region of interest as the object moves.

Each tracking component 510 reports the identity and pose P of its object of interest to the coordinator component 508, which in turn updates the object datastore 136. As described above, the information that the object datastore 136 stores may be used by other components in the system, such as by the projection module 134 to enable to the projector to project content toward a projection surface. Furthermore, positional information regarding tracked objects may be used by the coordinator component to update the definitions of the regions R to account for movement of the objects contained by the regions.

In some instances, the coordinator component may launch a tracking component 510 in response to identifying a potential object of interest. However, the newly launched tracking component 510 may determine that the identified potential object of interest is not in fact an actual object of interest. As such, the tracking component 510 (or the coordinator component 508) may store this indication such that the coordinator component 508 does not later launch another tracking component 510. That is, the tracking component 510 (or the coordinator component 508) may add the identified object (i.e., color, size, and other characteristics of the object) to a blacklist of objects such that the first thread no longer launches second threads in response to identifying this object.

In still other instances, the coordinator component 508 may launch a tracking component 510 in response to identifying an unknown object (or identifying this unknown object more than a threshold number of times). The tracking component 510 may then track this unknown object and provide the images or other metadata to another service for identification. For instance, the tracking component 510 may provide this information to a group of one or more human users, who in turn may attempt to identify the object and make a determination as whether this object is an object of interest that should be tracked in the future. If so, then the item (i.e., its color, size, and other characteristics) may be added to the list of objects that should be tracked.

When acquiring images, the image acquisition component 502 may be configured to use varying illumination intensities and/or integration times depending on which of the coordinator component 508 and/or tracking components 510 are to receive and analyze the acquired images. In some cases, all of the tracking component 510 may receive portions of the same depth image frame 504, which may have been acquired at a particular illumination intensity and integration time. The illumination intensity and integration time may be selected in these situations in light of observation goals and priorities with respect to each of the objects. In some cases, for example, the objects of interest may be within a relatively short distance from the depth sensor 220, and it may therefore be possible to use relatively short integration times to achieve fast frame rates and high temporal resolutions. Similarly, it may be that the shape of one of the objects needs to be analyzed in detail based on highly accurate depth data. In cases such as this, longer integration times may be utilized even though they may result in lower frame rates.

Observation goals may therefore be determined by whether it is more important to achieve high spatial depth accuracy or to achieve high temporal resolution to reduce motion blur caused by a moving object, or whether it is more important to detect shape or to detect motion. Thus, an observation goal may comprise (a) increasing or maximizing spatial depth accuracy, (b) increasing or maximizing temporal motion resolution to reduce motion blur caused by a moving object. Alternatively, an observation goal may comprise (a) detecting shape or (b) detecting motion. Sensing durations and/or illumination intensities may be increased in order to increase spatial accuracy. Sensing durations and/or illumination intensities may be decreased in order to increase temporal motion resolution or reduce motion blur.

In some situations, different illumination intensities and integration times may be used in successive frames to satisfy different goals of the tracking components 510 with respect to their corresponding objects.

Although illumination intensities and integration times are selected based on characteristics of observed and/or tracked objects when providing images for analysis by the tracking components 510, the illumination intensity and integration times used to acquire image frames for the coordinator component 508 may be selected based on more general goals, such as being able to detect any objects within a scene, regardless of distance. In many cases, this will involve longer integration times and slower frame rates to produce depth values for surface points at widely differing distances from the depth camera.

Figure 6:
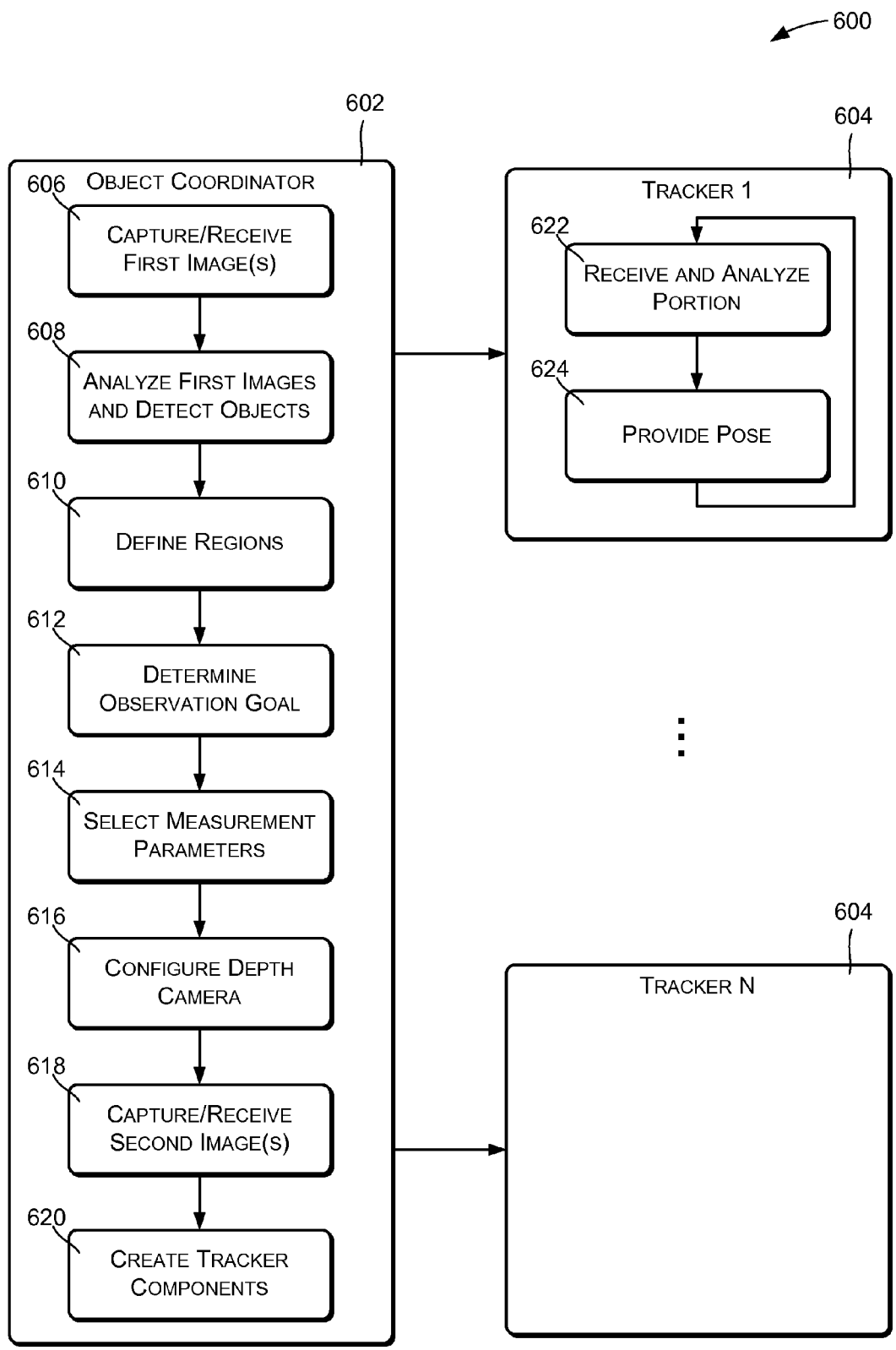
FIG. 6 is a flow diagram illustrating an example a process that may be performed by the ARFN to detect and track multiple objects within the environment.

FIG. 6 illustrates example methods 600 that may be performed by the object coordinator component 508 and the tracking components 510. The methods 600 are illustrated as logical flow graphs, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. The order in which the operations are described is not intended to be construed as a limitation, and any number of the described operations can be combined in any order and/or in parallel to implement the process.

The methods 600 include a method 602 performed by an object coordinator component 508 as well as a method 604 performed by each of the tracking components 510. The methods 600 may be performed in conjunction with one or more cameras that are configured to produce images of an environment or scene within the environment. Each image comprises pixel values corresponding respectively to surface points of the environment or scene.

The cameras may include a time-of-flight-based depth camera that produces depth images using a sensing duration within which a reflected light signal is sensed. The light signal may be transmitted as a modulated or pulsed light signal, and the depth camera may sense or measure phase differences between the transmitted light signal and reflected light signal as it is received by the depth camera.

The depth camera may be configured to capture or produce depth images or maps, each of which comprises an array of pixel values corresponding respectively to surface points of the environment. Each pixel value indicates the depth or distance of a surface point relative to an observation point.

The cameras may also include a color or greyscale camera that captures visible characteristics of the environment. Such a color or greyscale camera captures or produces images or maps containing pixel values indicating visible characteristics of the corresponding surface points such as color or greyscale values.

An action 606, performed by the object coordinator component 508, may comprises capturing and/or receiving a plurality of first images of an environment or scene containing objects that are to be detected, analyzed, identified, and/or tracked over time. The first images may include two-dimensional color/brightness images, such as optical greyscale images, RGB images, HSV images, CMYK images, etc., containing pixel values indicating colors of corresponding surface points within the observed scene. The first images may also include depth images or other depth images, containing pixel values indicating depths of corresponding surface points within the observed scene. Depth images obtained in the action 606 may be captured using time-of-flight measurements as described above, using relatively long sensor integration times so as to capture depth data for objects at varying distances from the depth camera.

An action 608 comprises analyzing one or more of the first images to detect and/or tentatively identify objects of interest within the environment or scene. Objects of interest may include users, user hands, user fingers, projection surfaces or areas, and other objects. Various color, shape, and pattern recognition techniques may be used to perform the action 608, based on the various types of images that may have been obtained in the action 606. The action 608 may be performed using relatively low complexity algorithms to detect the possible presence of objects and to determine rough locations for the objects. The action 608 may include determining distances of the objects from the depth camera, based on the obtained depth images.

An action 610 may comprise defining regions of the environment that contain the detected objects, and portions of the first images that contain representations of the objects.

An action 612 may comprise determining, providing, or receiving observation goals for the detected objects. In many situations, possible observation goals may include either increasing the spatial depth resolution of object analyses or increasing the temporal resolution of object analysis. Increasing the spatial depth resolution at which objects are analyzed may be appropriate in situations where it is desired to analyze shapes or positions of objects in detail. Increasing the temporal resolution at which objects are analyzed may be appropriate in situations where it is desired to closely monitor object motion and to detect specific trajectories made by objects.

An action 614 may comprise selecting one or more measurement parameters relating for use by a depth camera in capturing subsequent depth images of the environment. The measurement parameters may include illumination intensity and/or sensing duration. In some embodiments, measurement parameters may relate to types of signal modulation, types of sensing, and other characteristics of time-of-flight measurements.

The measurement parameters may be selected and/or changed based on the measurement goals corresponding to one or more of the detected objects. Generally, a relatively long sensing duration and/or high illumination intensity will be selected for an object having a goal of increasing spatial depth resolution. A relatively short sensing duration may be selected for an object having a goal of increasing temporal resolution. When different objects within a single scene have different observation goals, the goals may be prioritized. In some cases, intermediate measurement parameters may be selected in an attempt to accommodate differing and/or conflicting observation goals.

Measurement parameters may also be selected based on the distances of the objects from the depth camera as evaluated by the action 608. Specifically, sensing durations may be configured to be at least as long as the time needed for a light signal to propagate from the depth camera, to surfaces of detected objects of interest, and back to the depth camera. Longer sensing durations will generally be selected for objects at larger distances from the depth camera. In still other instances, measurement parameters may also be selected based on a reflectivity of an object. For instance, an object that is highly reflective (e.g., a mirror) may weigh in favor of using a relatively low illumination intensity, while a less reflective object may be identified and tracked more easily using a high illumination intensity. In addition, the difference between an object and its background (as defined by the field of view of the sensor) may be used to determine measurement parameters. For instance, an object having a relatively low reflectivity in front of a background having a relatively high reflectivity may be identified and tracked more easily with higher illumination intensity and/or a longer sensing duration.

An action 616 may comprise configuring a depth camera or other time-of-flight-based camera to capture depth images using the selected or changed measurement parameters.

An action 618 may comprise capturing and/or receiving a sequence of second images, which may include depth images or depth images produced by the depth camera using the configured measurement parameters.

An action 620 may comprise creating a tracking component 510 for each of the objects detected in the action 608. Each tracking component may comprise an independent process or thread that executes at a relatively high priority to analyze and track a detected object.

Each of the tracking components is configured to perform an action 622 of receiving and analyzing a portion of each of the depth images received in the action 618. The received portion correspond to the region of the object defined in the action 610. The action 620 may be configured to analyze only this received portion, and to utilize relatively more complex analytical algorithms to perform the analysis than are used in the action 608

An action 624 comprises tracking the object over time by determining a sequence of object locations and/or poses. The locations and/or poses may be provided for use by other components of the system, based on the analysis 622, in order to track the object over time. Object locations may be determined using the object detection and identification techniques described above, which may include template matching, shape recognition, color comparison, and/or feature detection.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   one or more cameras configured to produce images of an environment, wherein an individual image comprises pixel values corresponding respectively to surface points of the environment;
   the one or more cameras including a time-of-flight camera, wherein the images include depth images, and wherein a depth image is produced by the time-of-flight camera using a sensing duration within which a reflected light signal is sensed, an individual pixel value of the depth image indicating a distance of a corresponding surface point from the time-of-flight camera;
   one or more non-transitory computer-readable media storing computer-executable instructions that, when executed by the one or more processors, cause the one or more processors to perform acts comprising:
   analyzing one or more of the images to detect an object within the environment;
   defining a region of the environment that contains the object;
   determining a distance of the object from the time-of-flight camera;
   selecting a new sensing duration of the time-of-flight camera based at least in part on the sensing duration and the distance of the object from the time-of-flight camera, wherein the selecting the new sensing duration comprises at least one of increasing the sensing duration to increase spatial depth accuracy or decreasing the sensing duration to reduce motion blur;
   obtaining a sequence of the depth images produced by the time-of-flight camera using the new sensing duration; and
   analyzing a portion of an individual depth image of the sequence that corresponds to the defined region of the environment to track the object over time.

2. The system of claim 1, wherein analyzing one or more of the images to detect an object within the environment comprises one or more of:
   model comparison;
   template matching;
   shape recognition;
   color comparison; or
   feature detection.

3. The system of claim 1, wherein analyzing a portion of the individual depth image of the sequence that corresponds to the defined region of the environment to track the object over time comprises determining a sequence of locations of the object based on one or more of:
   model comparison;
   template matching;

shape recognition;
color comparison; or
feature detection.

4. The system of claim 1, wherein the time-of-flight camera determines phase differences between a transmitted light signal and the reflected light signal and converts the phase differences based at least on part on a known propagation speed of light to obtain the distances of the surface points from the time-of-flight camera.

5. The system of claim 1, wherein selecting the new sensing duration based at least in part on the sensing duration and the distance of the object to the time-of-flight camera comprises selecting the sensing duration based at least in part on a time needed for a light signal to propagate from the time-of-flight camera, to a surface of the object, and back to the time-of-flight camera.

6. A computer-implemented method implemented at least in part by a computing device coupled to a time-of-flight camera, the computer-implemented method comprising:
receiving one or more images of an environment;
analyzing at least one of the one or more images to identify an object within the environment;
changing a sensing duration of the time-of-flight camera based at least in part on a distance to the object from the time-of-flight camera, the changing of the sensing duration comprising at least one of increasing the sensing duration to increase spatial depth accuracy or decreasing the sensing duration to reduce motion blur;
configuring the time-of-flight camera to produce a depth image using the sensing duration as changed; and
analyzing the depth image to determine one or more characteristics of the object.

7. The computer-implemented method of claim 6, further comprising identifying a portion of the depth image corresponding to a region of the environment containing the object, wherein analyzing the depth image comprises analyzing the portion of the depth image.

8. The computer-implemented method of claim 6, the acts further comprising:
determining a time for a light signal to travel from the time-of-flight camera, to the object, and back to the time-of-flight camera; and
wherein the sensing duration is changed to be at least as long as the time.

9. The computer-implemented method of claim 6, wherein at least one of the one or more received images indicates distances of surface points within the environment relative to the time-of-flight camera.

10. The computer-implemented method of claim 6, wherein analyzing the depth image comprises one or more of:
model comparison;
template matching;
shape recognition;
color comparison; or
feature detection.

11. The computer-implemented method of claim 6, wherein the time-of-flight camera determines phase differences between a transmitted light signal and a reflected light signal and converts the phase differences to distances based at least on part on a known propagation speed of light to produce the depth image.

12. A method implemented at least in part by a computing device coupled to a time-of-flight camera, the method comprising:
receiving one or more images of an environment;
analyzing at least one of the one or more images to detect an object within the environment;
determining one or more observation goals for the object, the one or more observation goals comprising at least one of (a) increasing spatial depth resolution or (b) increasing temporal motion resolution to reduce motion blur;
selecting one or more measurement parameters for the time-of-flight camera based at least in part on the one or more observation goals, wherein the one or more measurement parameters comprise at least an illumination intensity;
configuring the time-of-flight camera to capture a depth image using the one or more measurement parameters; and
analyzing the depth image to determine one or more characteristic of the object.

13. The method of claim 12, further comprising identifying a portion of the depth image corresponding to a region of the environment containing the object, wherein analyzing the depth image comprises analyzing the portion of the depth image.

14. The method of claim 12, wherein:
the one or more measurement parameters further comprise a sensing duration; and
the selecting comprises selecting a relatively longer sensing duration when the observation goal is increasing spatial depth resolution than when the observation goal is increasing temporal motion resolution.

15. The method of claim 12, wherein:
the selecting comprises selecting a relatively higher illumination intensity when the observation goal is increasing spatial depth resolution than when the observation goal is increasing temporal motion resolution.

16. The method of claim 12, wherein the one or more measurement parameters further comprise a sensing duration, and wherein the method further comprises:
determining a time for a light signal to travel from the time-of-flight camera, to the object, and back to the time-of-flight camera; and
wherein the sensing duration is selected to be at least as long as the time.

17. The method of claim 12, wherein at least one of the one or more images indicates relative distances of surface points within the environment.

18. The method of claim 12, wherein analyzing the depth image comprises one or more of:
model comparison;
template matching;
shape recognition;
color comparison; or
feature detection.

19. The method of claim 12, wherein the time-of-flight camera determines phase differences between a transmitted light signal and a reflected light signal and converts the phase differences to distances based at least on part on a known propagation speed of light to produce the depth image.

20. The method of claim 12, further comprising selecting the one or more parameters for the time-of-flight camera based on a distance to the object from the time-of-flight camera.

* * * * *